Feb. 13, 1951 M. ARDITI ET AL 2,541,019

DEMODULATOR SYSTEM

Filed July 27, 1946

INVENTORS
MAURICE ARDITI
IRWIN H. FRANZEL
JOSEPH FEINSTEIN

BY R. P. Morris

ATTORNEY

Patented Feb. 13, 1951 2,541,019

UNITED STATES PATENT OFFICE 2,541,019

DEMODULATOR SYSTEM

Maurice Arditi, New York, and Irwin H. Franzel and Joseph Feinstein, Brooklyn, N. Y., assignors to Federal Telecommunication Laboratories, Inc., New York, N. Y., a corporation of Delaware Application July 27, 1946, Serial No. 686,690

3 Claims. (Cl. 250—27)

This invention relates to demodulator systems for time modulated pulse communication systems, and has particular reference to demodulators using cathode ray tubes.

In certain proposed types of demodulators for time modulated pulse systems, such as for example, in E. Labin-D. D. Grieg, Serial No. 565,152, filed November 25, 1944, now U. S. Patent No. 2,465,380 dated March 29, 1949, use is made of a cathode ray tube to which beam-deflecting voltages are applied to sweep the beam over target elements. The beam is turned on by each incoming pulse and the time modulation of the pulse determines how much of each of target elements is struck by the beam each time it is turned on. The output of the target element, which element is a dynode or secondary emission electrode, is thereby varied in amplitude according to the time modulation of the incoming pulses. In such systems it is important that the beam current distribution be uniform in order to avoid distortion.

An object of the present invention is the provision of an improved demodulator for time modulated pulses of the type using cathode ray tubes.

Another object is the provision of a demodulator system, using cathode ray tubes, which is relatively independent of the beam current density distribution.

Another object is the provision of a demodulator system using a cathode ray tube providing higher sensitivity than similar previous systems.

Figure 1:
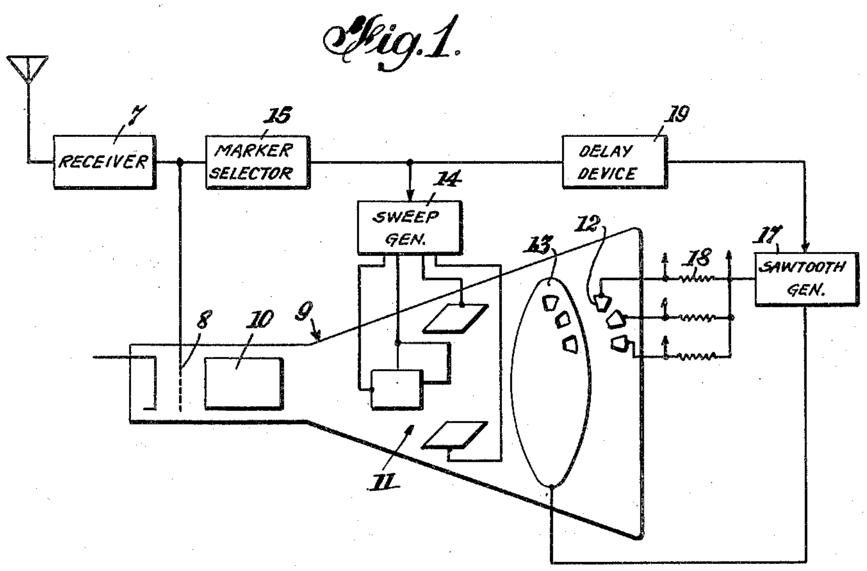
Figure 2:
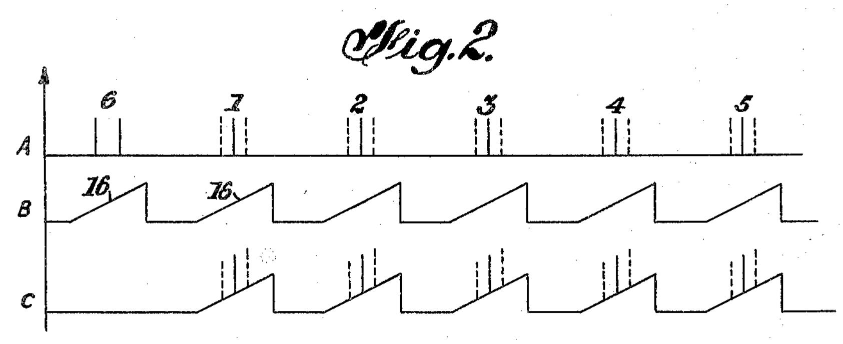

The above-mentioned and other features and objects of this invention will become more apparent and the invention itself, though not necessarily defined by said features and objects, will be best understood by reference to the following description of an embodiment of the invention taken in connection with the accompanying drawings, wherein:

Fig. 1 is a schematic and block diagram of a demodulator system particularly adapted for multi-channel time modulated pulse communication systems, and utilizing a cathode ray tube; and Fig. 2 is a set of curves used in describing the operation of the system of Fig. 1.

Our present invention is herein particularly described with respect to a time modulated pulse communication system in which a succession of signal pulses as for example, pulses 1, 2, 3, 4, 5, etc., (curve A, Fig. 2) follow a marker signal 6 which may be in the form of dual pulses having a different separation than the other pulses or have some other defining characteristic. Each pulse of the series, forms a separate channel and the signal pulses are varied in time between limits, as indicated by the dotted lines on either side thereof, in accordance with the amplitude of the signal carried thereby. Such series of pulses are repeated, with the signal pulses of each series being varied in accordance with said signal amplitude variation, to form a train which may be used to modulate a carrier and then transmitted.

The pulses shown in Fig. 2, curve A, may reappear at the output of a receiver 7 and are applied to the grid 8 of a cathode ray tube 9 which is provided with the usual electron gun elements 10, deflection means, such as deflection plates 11, and target elements 12, which target elements preferably equal in number the number of channels and may consist of secondary emission electrodes or dynodes mounted behind an aperture plate 13.

The beam in said tube may be swept by means of voltages derived from the sweep generator 14 which may be synchronized with the marker pulses. For synchronization, the output of receiver 7 may also be fed to a marker selector 15, of known type, whose output is applied to sweep generator 14. The target elements 12 may be arranged in any suitable pattern such as for example, in a circle and the sweep generator provides the proper sweep. When the beam is to be swept in a circle, the sweep generator 14 may produce at its output two sine waves of equal frequency applied 90° out of phase to the horizontal and vertical deflecting plates respectively. The sweep generator provides for cyclically sweeping the beam over the target electrodes once for each marker signal, that is, in synchronism with the repetition rate of said marker signals. The apertures in aperture plate 13 are made wide enough so that despite the time modulation of the signal pulses, the entire beam will strike one target element for each signal pulse. This assures that amplitude variations due to passing of different portions of the beam will not occur.

Whenever the beam strikes one of the target elements, current flows between said element and the aperture plate 13 which serves as the anode. For a given beam density, the value of the current will differ with different voltages applied between said target elements and the plate. Between certain voltages this variation of current flow with variations of voltage is substantially linear. In accordance with a feature of the present invention, pulses having voltages within this range of linearity and having a sloping characteristic are applied between each of the target elements and the aperture plate. The sloping pulses are regularly repeated. They have a greater duration than the signal pulses and are so timed that each signal pulse turns on the beam during the time that the sloping portion of one of said sloping pulses is being applied to the target element of the same channel. Each time the beam, in response to a signal pulse, strikes a target element, the voltage between said target element and the aperture plate is changing and, depending upon the time modulation of the signal pulse, the beam will strike the target element at times when said voltage is different, accordingly resulting in different values of current output. In the system illustrated, the sloping voltages consist of saw-tooth pulses applied between each of the target elements and the aperture plate 13. These pulses have a repetition frequency substantially equal to the repetition frequency of unmodulated signal pulses and are impressed in succession on succeeding target elements as is indicated in curve B, Fig. 2, where said curve represents voltages impressed on all of successive target elements. The sawtooth pulses 16 are regularly repeated and may be synchronized with the marker pulses which are likewise regularly repeated. The signal pulses on the other hand are displaced in time in proportion to the amplitude of the modulating signal. Accordingly, the output derived from said target elements will vary in accordance with the time modulation of the signal pulses.

For the purpose of accomplishing the foregoing, a saw-tooth generator 17 having a voltage characteristic of curve B Fig. 2 is coupled between the target elements 12 and the aperture plate or anode 13. Each signal pulse on grid 8 will release the beam at a time corresponding to its modulation displacement. Due to the current flow produced by the impinging beam, voltages will be produced across resistors 18 each in series with one of said sawtooth generators and its associated electrodes, which voltages will vary in amplitude in accordance with the time modulation of the signal pulses between given limits as indicated by the dotted line position of pulses shown in curve C Fig. 2. The output of selector 15 is applied through a suitably adjusted delay device 19 to the sawtooth generator 17 to synchronize said generator.

While we have referred to the use of sawtooth pulses, it will also be apparent that in place thereof, other types of pulses having sloping portions may be employed such as for example, trapezoidal pulses and the like. Furthermore, while we have described above the principles of our invention in connection with specific apparatus, it is to be clearly understood that this description is made only by way of example and not as a limitation on the scope of our invention.

We claim:

1. A pulse translating system comprising a secondary emissive target electrode, means responsive to applied pulses for directing a beam of electrical energy at said target electrode, a collector electrode, and means for applying a varying voltage between said electrodes during a period within which the beam strikes the target electrode.

2. In a demodulator for time modulated pulses, a secondary emissive target electrode, means for producing an electron beam in response to each of said pulses, means for cyclically deflecting said beam to cross said target electrode, a collector electrode, and means for periodically applying pulses having a sloping voltage characteristic between said electrodes so that the beam strikes the target electrode during some portion of the sloping voltage.

3. In a demodulator for time modulated pulses, a secondary emissive target electrode, means for producing an electron beam in response to each of said time modulated pulses, means for cyclically deflecting said beam to cross said target electrode, a collector electrode, and means for applying between said electrodes a plurality of regularly repeated pulses having a greater duration than said time modulated pulses and having a sloping voltage characteristic, said sloping pulses being applied to said element for a period covering the entire range of time displacement of the production of the beam due to the time displacement of the time modulated pulses.

MAURICE ARDITI.
IRWIN H. FRANZEL.
JOSEPH FEINSTEIN.

REFERENCES CITED

The following references are of record in the file of this patent:

UNITED STATES PATENTS

| Number | Name | Date |
|---|---|---|
| 2,069,441 | Headrick | Feb. 2, 1937 |
| 2,086,904 | Evans | July 13, 1937 |
| 2,173,193 | Zworykin | Sept. 19, 1939 |
| 2,344,679 | Crosby | Mar. 21, 1944 |
| 2,391,776 | Fredendall | Dec. 25, 1945 |
| 2,474,811 | Arditi et al. | July 5, 1949 |

FOREIGN PATENTS

| Number | Country | Date |
|---|---|---|
| 498,577 | Great Britain | Jan. 10, 1939 |